J. BRIZEE.
Clothes-Line Reels.
No. 138,785.
Patented May 13, 1873.
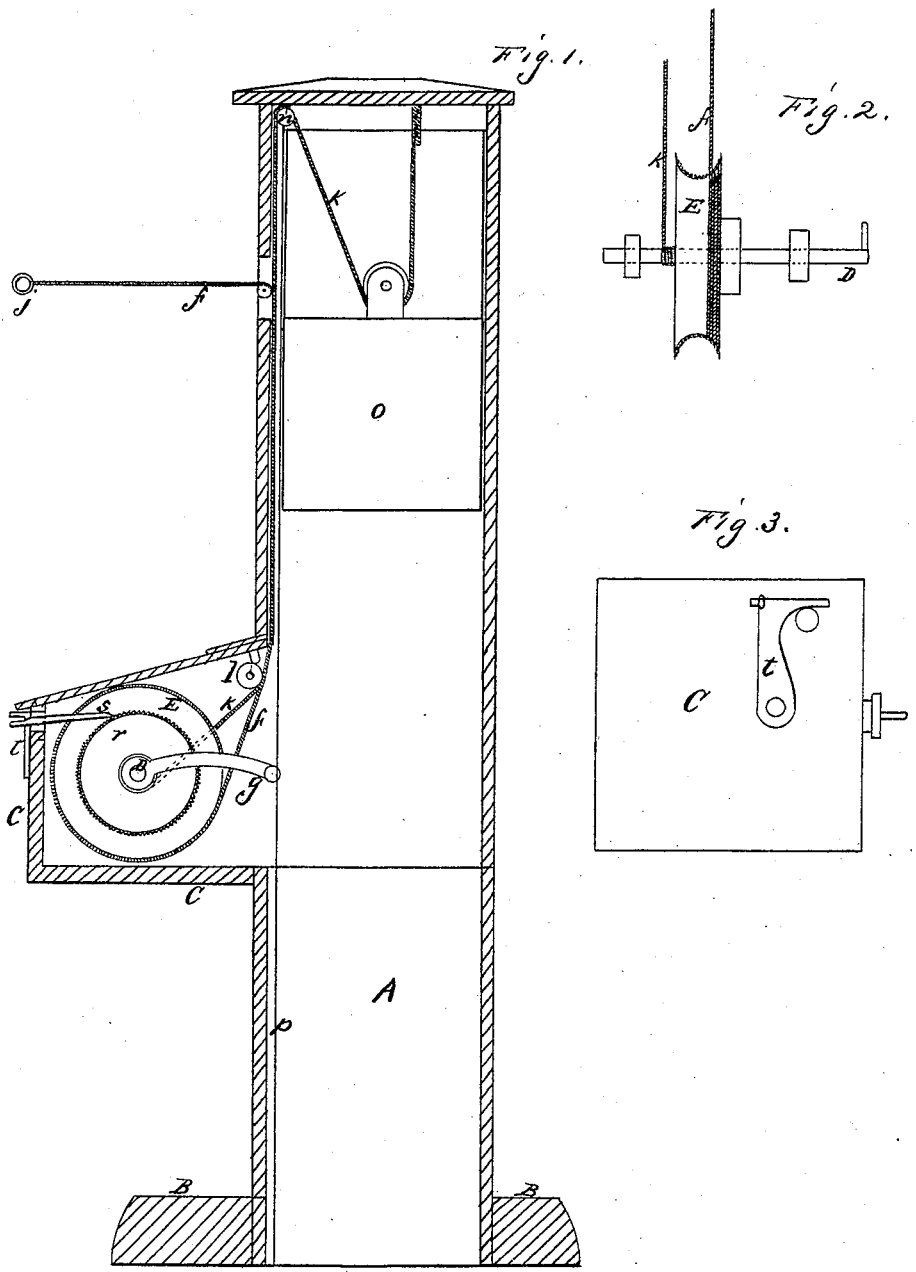

UNITED STATES PATENT OFFICE.

JOHN BRIZEE, OF ALVARADO, CALIFORNIA.

IMPROVEMENT IN CLOTHES-LINE REELS.

Specification forming part of Letters Patent No. 138,785, dated May 13, 1873; application filed March 28, 1873.

*To all whom it may concern:*

Be it known that I, JOHN BRIZEE, of Alvarado, Alameda county, State of California, have invented an Improved Clothes-Line Reel and Tightener; and I do hereby declare the following description and accompanying drawing are sufficient to enable any person skilled in the art or science to which it most nearly appertains to make and use my said invention or improvement without further invention or experiment.

My invention relates to that class of clothes-line reels which are incased in a box, and in which a weight is employed to revolve the shaft in an opposite direction from that in which the line is wound upon it so as to automatically wind up the line when it is not in use.

My improvement consists in an arrangement of a single shaft for winding both clothes-line and weight-line with an upright box for containing both with an apparatus whereby the line may be tightened.

In order to more fully illustrate and explain my invention, reference is had to the accompanying drawing forming a part of this specification, in which—

Figure 1 is a side sectional elevation of my reel. Fig. 2 shows the axle for the weight, cord, and the pulley for the line. Fig. 3 shows the device for holding the pawl out of contact with the ratchet.

A represents an upright box or hollow tube, inside of which the weight will move. This box or tube can be of any desired height, and can be either secured upon a proper base, B, on top of the ground, or it can be set down in the ground any desired distance. At the proper height from the ground I make a box-extension, C, to one side of the tube A, in which the clothes-line reel is placed. A shaft, d, passes across this box, and secured upon the shaft inside of the box C is a large pulley, E. One end of the clothes-line f is secured to this pulley, and the line is wound upon it by means of crank g on the end of shaft d. The opposite end of the line is then carried up and through a hole and over a pulley in the front of the tube or box A at a height corresponding with the height it is desired to have the end of the line elevated from the ground. A ring, j, is then secured to the end of the line to prevent it from being drawn through the hole in the tube or box. The weight-cord K has one end secured to the shaft d beside the pulley E. Thence it is carried back of a roller, l, and up over a pulley, n, at the top of the box A; thence down to near the bottom of the tube, where it is attached to a weight, O. Now, it will be seen that as the clothes-line is drawn out the reel or pulley E is revolved so as to wind up the weight, but when the strain upon the clothes-line is removed the weight will wind the shaft in the opposite direction, and thus wind up the line. A strip, p, is secured in each of the front angles of the box A, so as to prevent the weight O from touching the cord K when it moves upward in the box. A ratchet-wheel, x, is secured upon the shaft d beside the pulley E, and a pawl, s, engages with the ratchet. The opposite end of the pawl extends to the outside of the box, as shown, and a hook, t, serves to support the pawl out of contact with the ratchet when its use is not required. After the clothes-line has been drawn out and the free end fastened to a post or other object the line can be tightened by means of the crank g, and the pawl s allowed to engage with the ratchet so as to keep it at any desired tension. The box-extension C can be provided with a hinged door so as to serve as a receptacle for clothes-pins, if desired.

Having thus described my improvements, what I claim, and desire to secure by Letters Patent, is—

A clothes-line reel, consisting of the upright box A, with its extension C having the shaft d, with its pulley E, the ratchet-wheel r, pawl s, hook t, clothes-line f, weight-cord K, and weight O, all constructed and arranged as shown, and for the purpose above described.

In witness whereof I hereunto set my hand and seal.

JOHN BRIZEE. [L. S.]

Witnesses:
J. L. BOONE,
C. M. RICHARDSON.